United States Patent [19]

Komurasaki et al.

[11] Patent Number: 4,967,114
[45] Date of Patent: Oct. 30, 1990

[54] ACCELERATION DETECTOR

[75] Inventors: Satoshi Komurasaki; Atsushi Ueda, both of Himeji, Japan

[73] Assignee: Mitsubishi Denki Kabushiki Kaisha, Tokyo, Japan

[21] Appl. No.: 336,103

[22] Filed: Apr. 11, 1989

[30] Foreign Application Priority Data

| Apr. 13, 1988 | [JP] | Japan | 63-92145 |
| Apr. 14, 1988 | [JP] | Japan | 63-51265 |
| Aug. 4, 1988 | [JP] | Japan | 63-102749 |
| Aug. 4, 1988 | [JP] | Japan | 63-102750 |
| Aug. 10, 1988 | [JP] | Japan | 63-104889 |
| Aug. 11, 1988 | [JP] | Japan | 63-105403 |

[51] Int. Cl.$^5$ .................................... H01L 41/08
[52] U.S. Cl. .................................... 310/329; 73/35
[58] Field of Search .............. 310/329, 338, 345; 73/35, 517 R, 654, DIG. 4

[56] References Cited

U.S. PATENT DOCUMENTS

| 2,714,672 | 8/1955 | Wright et al. | 310/329 |
| 3,060,333 | 10/1962 | Bradley, Jr. | 310/329 |
| 3,075,099 | 1/1963 | Shoor | 310/329 |
| 3,233,465 | 2/1966 | Tolliver et al. | 310/329 X |
| 3,389,276 | 6/1968 | Gradin et al. | 310/329 X |
| 3,390,286 | 6/1968 | Gradin et al. | 310/329 |
| 3,400,284 | 9/1968 | Elazar | 310/329 X |
| 3,487,238 | 12/1969 | Angleton et al. | 310/329 |
| 3,566,163 | 2/1971 | Fischer et al. | 310/329 |
| 3,612,921 | 10/1971 | Springate | 310/329 |
| 3,714,476 | 1/1973 | Epstein | 310/329 |
| 4,225,802 | 9/1980 | Suzuki et al. | 310/321 |
| 4,399,705 | 8/1983 | Weiger et al. | 310/329 X |
| 4,637,246 | 1/1987 | Lombard et al. | 310/329 X |

FOREIGN PATENT DOCUMENTS 737838  5/1980  U.S.S.R. .......................... 310/329

Primary Examiner—Mark O. Budd
Attorney, Agent, or Firm—Sughrue, Mion, Zinn, Macpeak & Seas

[57] ABSTRACT

An acceleration detector of the present invention which may be secured by a single screw to an internal combustion engine comprises a housing and a piezoelectric acceleration transducer assembly mounted in the housing by a stop nut. The detector comprises a recess for being engaged by a projection of the engine for positioning and preventing an undesirable rotation of the housing upon turning of the stop nut. The acceleration detector may comprise a low-friction washer between the nut and the terminal of the transducer assembly for preventing an undesirable rotation of the terminal upon turning of the nut. Alternatively, one of the terminals of the acceleration transducer assembly is made sufficiently rigid to permit the use of a tool on it to firmly hold it. An electrically insulating stopper projection may be provided between the terminals to prevent an undesirable rotation of the terminals. In order to facilitate the precise assembly of the acceleration transducer assembly, projection tabs are provided on the terminal for engagement with the piezoelectric element. Also, the contact surface of the stop nut may contact substantially the entire surface of the weight.

8 Claims, 4 Drawing Sheets

ACCELERATION DETECTOR

BACKGROUND OF THE INVENTION

This invention relates to an acceleration detector and more particularly to an acceleration detector for detecting; knocking in an internal combustion engine.

FIGS. 1 to 4 illustrate one example of a conventional acceleration detector to which the present invention can be applied. This acceleration detector is attached, when in use, to an internal combustion engine for detecting vibration or knocking of the engine.

The acceleration detector comprises a housing 1 defining an annular cavity 2 therein and an acceleration transducer assembly 3 disposed within the cavity 2. The housing 1 comprises a tubular bushing 4 having a through hole 5 and a flange 6. The housing 1 also comprises a ring shaped outer case 7 bonded to the flange 6 of the bushing 4 so that the cavity 2 is defined therein. The outer case 7 also has a connector 8 radially outwardly extending from the outer case 7 so that an output terminal 9a (FIG. 1) and a ground terminal 9b (FIG. 2 can extend through the connector 8 for taking out an output signal from the acceleration transducer assembly 3 disposed within the cavity 2. The acceleration transducer assembly 3 includes a washer-shaped terminal plate 10 connected to the ground terminal 9b through a lead 10a integrally extending from the terminal plate 10. The terminal plate 10 is placed on the flange 6 of the bushing 4. The acceleration transducer assembly 3 further includes an annular piezoelectric element 11 placed on the terminal plate 10, a washer-shaped terminal 12 including a lead 12a connected to the output terminal 9a, an electrically insulating washer 13 disposed on the washer terminal 12, an annular inertial weight 14 placed on the insulating washer 13 and a threaded ring-shaped stop nut 15 thread-engaged with the thread 4a on the tubular bushing 4. The insulating washer 13 may be made of a sheet of polyethylene terephtalate (PET), polyphenylene sulfite (PPS) or the like. An electrically insulating tape or tube 16 is placed on the tubular bushing 4 so that the acceleration transducer assembly 3 is insulated from the bushing 4 even when the washer terminals 10 and 12 as well as the piezoelectric element 11 are eccentrically assembled.

In order to resiliently support and protect the acceleration transducer assembly 3 within the cavity 2 from undesirable environmental conditions, the remaining space of the cavity 2 of the housing 1 which is not occupied by the acceleration transducer assembly 3 is substantially filled with a resilient filler material 17 of a thermo-setting resin. The filler material 17 must be sufficiently resilient after it is cured to allow the movement of the inertial weight 14 relative to the housing 1 when an acceleration is applied to the inertial weight 14 so that the piezoelectric element 11 generates a voltage signal proportional to the pressure exterted on it by the relative movement of the inertial weight 14 against the piezoelectric element 11.

When in use, the acceleration detector is securely mounted on an internal combustion engine (not shown) by a bolt (not shown) inserted into the central through hole 5 of the housing 1. The acceleration or the vibration of the internal combustion engine produces the movement of the inertial weight 14 relative to the housing 1, which causes the piezoelectric element 11 to be stressed by the inertial weight 14, whereby an electrical signal indicative of the movement of the inertial weight 14 relative to the engine is generated from the piezoelectric element 11. The electrical signal is provided through the washer terminal 12, the lead 12a and the output terminal 9a to be analyzed to determine as to whether or not a knocking signal which generates upon knocking of the internal Combustion engine is involved. When it is determined that a knocking signal is contained in the electrical signal, the operating parameters for operating the engine can be adjusted to increase the output power or decrease the fuel consumption rate.

Since the acceleration detector above described utilizes a stop nut 15 thread-engaged with the thread portion 4a of the tubular bushing 4 of the housing 1, the bushing 4 and the acceleration transducer assembly 3 must be held stationary so as not to be rotated together with the stop nut 15 when the stop nut 15 is turned on the cylindrical bushing 4 of the housing 1 to be securely tightened against the acceleration transducer assembly 3 during assembly.

While the outer case 7 of the housing 1 which has a projection in the vicinity of the connector 8 can be held by any suitable tool during the turning of the stop nut 15, a special care must be taken not to damage the outer case 7 which is usually made of a relatively soft thermo-setting resin. Also, since the outer case 7 is attached to the bushing 4 by a bonding agent, the bonding agent between the outer case 7 and the bushing 4 must receive the stress when a turning force is applied to the bushing 4 from the stop nut 15 and the outer case 7 is held stationary.

Further, the tightening rotation of the stop nut 15 can cause the rotation of the inertial weight 14, the insulating washer 13, the washer terminal 12 and the like of the acceleration transducer assembly 3 relative to the housing 1 due to the friction between these components. This may cause the misalignment of terminal lead 12a in the circumferential direction relative to the output terminal 9a. If the misalignment of the terminal lead 12a is too large, the electrical connection between the terminal lead 12a and the output terminal 8 becomes impossible. In such case, the stop nut 15 must be loosened, the washer terminal 12 must be turned to put the terminal lead 12a into the correct position, and the stop nut 15 must be tightened again with a great care and hope so that no misalignment occurs this time. This results in an extended assembly time, leading to an increased cost of the acceleration detector.

This undesirable rotation of the terminal washer 12 cannot be prevented by simply firmly holding the terminal lead 12a against circumferential movement by a suitable tool or a jig, because the terminal leads 10a and 12a are both as thin as from 0.1 mm to 0.2 mm and has a rigidity insufficient to mechanically support the rotational torque applied from the stop nut 15 to the terminal washer 12. If the terminal lead 10 or 12a is firmly held by a tool and the stop nut 15 turned, the terminal lead 10 or 12a as well as the terminal plate 10 or 12 can be easily deformed or damaged by the stress applied thereon from the stop nut 15.

It is also desirable to provide a mechanical positioning means, which also mechanically isolates two terminal leads, in the detector in order to ensure an easy assembly of the detector and a proper electrical connection between the terminal and the leads.

Further, during assembly of the acceleration transducer assembly 3, the bottom end of the insulating tube 16 may sometimes be raised from the inner surface of the flange 6 of the bushing 4, and the inner periphery of the washer terminal 10 is inserted therebetween to be positioned in an eccentric relationship relative to the bushing 4 and to the piezoelectric element 11 as illustrated in FIG. 4. In this position, the washer terminal 10 is eccentric to the piezoelectric element 11 so that a portion of the piezoelectric element 11 is unevenly in contact with the washer terminal 10, resulting in an inaccurate output signal supplied from the acceleration transducer assembly 3.

Also, since the outer diameter of the stop nut 15 is smaller than the outer diameter of the inertial weight 14, the inertial weight 14 cannot be contacted by the stop nut 15 at the entire contacting surface. Therefore, the inertial force of the weight 14 does not effectively act on the piezoelectric element 11 and the output signal generated by the piezoelectric element 11 is small for the mass of the weight 14.

SUMMARY OF THE INVENTION

Accordingly, one obJect of the present invention is to provide an acceleration detector that can be easily assembled.

Another object of the present invention is to provide an acceleration detector in which a rotating torque acting or the bushing from the thread-engaging stop nut is not transmitted to the glue bonding the outer case and to the outer case.

Another object of the present invention is to provide an acceleration detector in which a rotation of the terminal washer of the acceleration transducer assembly due to the tightening rotation of the stop nut is prevented.

Another object of the present invention is to provide an acceleration detector in which a rotation of the terminal washer of the acceleration transducer assembly due to the tightening rotation of the stop nut can be prevented by firmly holding the terminal lead of the terminal washer.

A further object of the present invention is to provide an acceleration detector in which a mechanical positioning means which also mechanically isolates the output and the ground terminal leads is provided in order to ensure an easy assembly and a proper electrical connections between the terminals and the leads.

Still another object of the present invention is to provide an acceleration detector in which the washer terminal can be accurately positioned relative to the piezoelectric element.

A further object of the present invention is to provide an acceleration detector in which the inertia of the weight efficiently acts upon the piezoelectric element.

With the above objects in view, the acceleration detector of the present invention which may be secured by a single screw to an internal combustion engine comprises a housing defining a cavity therein, and an acceleration transducer assembly disposed in the cavity and including a piezoelectric element and an inertial weight. The transducer assembly is secured by a nut thread engaging to the housing the housing and having a contact surface at which the nut contacts and supports the transducer assembly. A resilient filler material is applied around the acceleration transducer assembly for resiliently sealing and supporting the acceleration transducer assembly. The acceleration detector further comprises a recess for being engaged by a projection of the engine for preventing an undesirable rotation of the housing relative to the engine upon turning of the thread-engaging fastener relative to the housing.

The acceleration detector may comprise a low-friction washer disposed between the nut and the electrical terminal of the transducer assembly for preventing an undesirable rotation of the electrical terminal upon turning of the nut. Alternatively, one of the electrical terminals of the acceleration transducer assembly is made sufficiently rigid to permit the use of a tool on it to firmly hold it. An electrically insulating stopper projection may be provided between the electrical terminals to prevent an undesirable rotation of the electrical terminals upon turning of the thread-engaging fastener relative to the housing. In order to facilitate the precise assembly of the acceleration transducer, projection tabs are provided on the electrical terminal for engaging with the piezoelectric element. Also, the acceleration detector may comprise a stop nut for holding the transducer assembly onto the housing, the contact surface of the stop nut contacting substantially the entire surface of the weight.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 5:
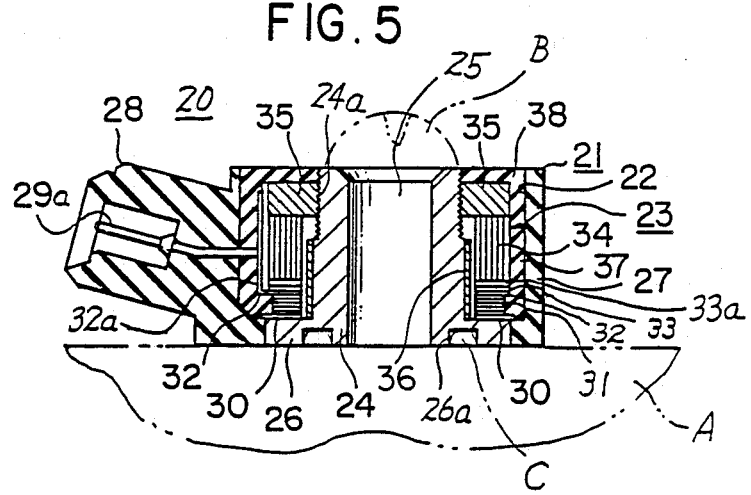
FIG. 5 is a sectional side view of one embodiment of the acceleration detector constructed in accordance with the present invention, in which the recesses for being engaged by projections of the engine are provided in the bottom surface of the bushing, the section being taken along line 5—5 of FIG. 6.
Figure 6:
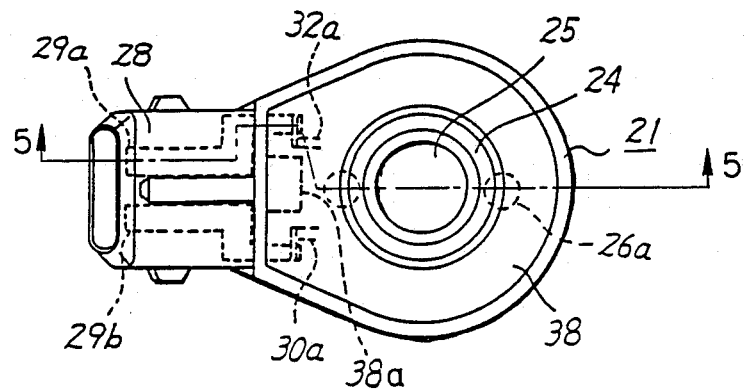
FIG. 6 is a plan view of the acceleration detector shown in FIG. 5.

FIGS. 5 and 6 illustrates an acceleration detector 20 of the present invention which can be attached to an internal combustion engine A for detecting vibration or knocking of the engine. The acceleration detector 20 comprises a ring-shaped housing 21 defining an annular cavity 22 therein and an annular acceleration transducer assembly 23 disposed within the cavity 22.

The housing 21 comprises a tubular bushing 24 having a central through hole 25 and a flange 26. The housing 21 also comprises a ring-shaped outer case 27 connected to the flange 26 of the bushing 24 so that the cavity 22 is defined therein. The acceleration detector 20 can be attached to the internal combustion engine by a screw B extending through the central bore 25 of the bushing 24 and thread-engaged with the engine A. According to the present invention, the flange 26 of the bushing 24 has formed on its bottom surface for contacting with the engine a pair of circular dimples or recesses 26a for receiving therein projections C provided on the engine A. The recesses 26a of the housing 21 and the projections C on the engine A engage each other to accurately and easily position the housing 21 and also to prevent any undesirable rotation of the housing 21 during the turning of a stop nut 35 on the housing 21. The number of the recesses 26a may be suitably determined according to the dimensions of the recesses 26a and the tightening torque on the stop nut 35.

The outer case 27 also has a connector 28 radially outwardly extending from the outer case 27 so that an output terminal 29a and a ground terminal 29b (FIG. 6) can extend through the connector 28 for taking out an output signal from the acceleration transducer assembly 23 disposed within the cavity 22. The acceleration transducer assembly 23 includes a washer shaped terminal plate 30 connected to the ground terminal 29b through a lead 30a integrally extending from the terminal plate 30. The terminal plate 30 is placed on the flange 26 of the bushing 24. The acceleration transducer assembly 23 further includes an annular piezoelectric element 31 placed on the terminal plate 30, a washer-shaped terminal 32 including a lead 32a connected to the output terminal 29a, an electrically insulating washer 33 disposed on the washer terminal 32, a low-friction washer 33a on the insulating washer 33, an annular inertial weight 34 placed on the low-friction washer 33a and the threaded ring-shaped stop nut 35 thread engaged with the thread 24a on the tubular bushing 24.

According to the present invention, the low-friction washer 33a is made of a hard or low-frictional material such as phosphor bronze plate, PPS sheet, fluorine resin, or the like in order to reduce any friction between the washer terminal 32, the insulating washer 33 and the inertial weight 34 so that any undesirable turning of the housing 21 is prevented as the stop nut 35 is being tightened. An electrically insulating tube 36 is placed on the tubular bushing 24 so that the acceleration transducer assembly 23 is insulated from the bushing 24 even when the washer terminals 30 and 32 are eccentrically assembled.

Also according to the present invention, as shown in FIG. 6, the outer case 27 is provided on its inner circumferential surface between the inner end of two terminals 29a and 29b with an electrically insulating barrier or a positioning projection 38 inwardly extending from the inner wall surface of the outer case 27. The projection 38 has two side surfaces 38a which extend between the electrical terminals 29a and 29b for being engaged by either one of the terminals 29a or 29b when they are moved during the tightening rotation of the stop nut 35. Thus, the projection 38 serves to prevent an undesirable rotation of the terminals 29a and 29b upon tightening turning of the stop nut 5 relative to the housing 21.

It should be noted that the outer diameter of the stop nut 35 is substantially equal to or greater than the outer diameter of the inertial weight 34 so that substantially entire top surface of the inertial weight 34 is in contact with the bottom or contact surface of the stop nut 35. Therefore, the inertial force of the weight 34 effectively acts on the piezoelectric element 31, so that the piezoelectric element 31 can efficiently generate an output signal, improving the sensitivity of the acceleration detector. According to the results of the experiments on the level of the detection signal with respect to the diameter of the stop nut 35, the level of the detected signal and accordingly the efficiency of the action of the inertial stress of the weight 34 against the piezoelectric element 31 are decreased as the outer diameter of the stop nut 35 is made smaller relative to the outer diameter of the piezoelectric element 31. That is, with the inertial weight 34 of an outer diameter of 24 mm, the level of the detected signal when a stop nut of an outer diameter of 22 mm was used was about 11% less than that when a stop nut of 24 mm was used, and the level of the detected signal level when a stop nu of an outer diameter of 20 mm was used was about 17% less than that when a stop nut of an outer diameter of 24 mm was used. It was also found that the effect of the change in the thickness of the stop nut 35 on the detected signal level is small, so that it can be suitably determined in connection with the design of other components.

In order to resiliently support and protect the acceleration transducer assembly 23 within the cavity 22 from undesirable environmental conditions, the remaining space of the cavity 22 of the housing 21 which is not occupied by the acceleration transducer assembly 23 is substantially filled with a resilient filer material 37 of a thermo-setting resin. The filler material 37 must be sufficiently resilient after it is cured to allow the movement of the inertial weight 34 relative to the housing 21 when an acceleration is applied to the inertial weight 34 so that the piezoelectric element 31 generates a voltage signal proportional to the pressure exerted on it by the relative movement of the inertial weight 34 against the piezoelectric element 31.

When in use, the acceleration detector is securely mounted on the internal combustion engine A by the bolt B inserted into the central through hole 25 of the housing 11 and thread-engaged into the engine A. The acceleration or the vibration of the internal combustion engine A produces the movement of the inertial weight 34 relative to the housing 21, which causes the piezoelectric element 31 to be stressed by the inertial weight 34, whereby an electrical signal indicative of the movement of the inertial weight 34 relative to the engine A is generated from the piezoelectric element 31. The electrical signal is provided through the washer terminal 32, the lead 32a and the output terminal 29a to an external circuit (not shown) to be analyzed to determine as to whether or not a knocking signal is contained in the electrical signal, the operating parameters for operating the engine can be adjusted to increase the output power or decrease the fuel consumption rate.

Figure 7:
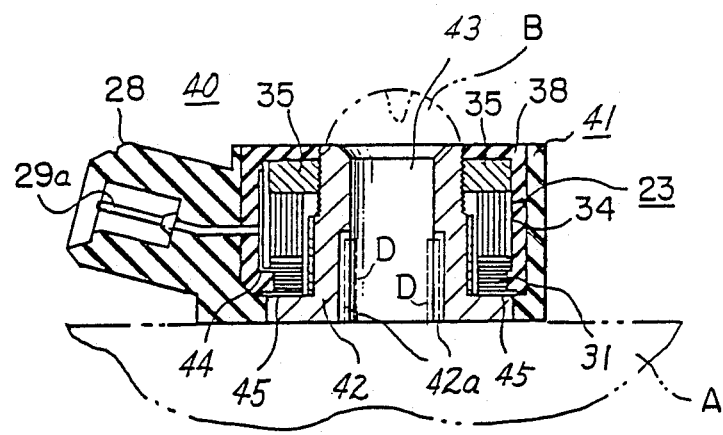
FIG. 7 is a sectional side view of another embodiment of the acceleration detector constructed in accordance with the present invention, in which the recesses for being engaged by projections of the engine are provided in the inner cylindrical surface of the central bore of the bushing.
Figure 8:
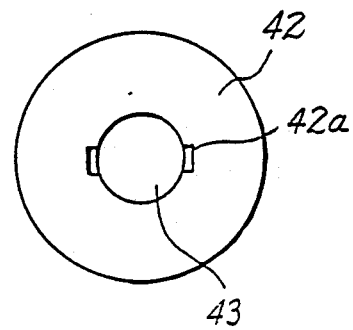
FIG. 8 is a bottom view of the bushing illustrated in FIG. 7.

FIGS. 7 and 8 illustrate another embodiment of the acceleration detector of the present invention. The acceleration detector 40 of this embodiment has a housing 41 in which bushing 42 is provided having a central bore 43 for allowing the mounting screw B to pass therethrough. The bore 43 has a pair of recesses 42a for receiving therein projections D extending from the engine A. The recesses 42a of this embodiment are in the form of an axially-extending groove formed in the inner cylindrical surface of the central bore 43. While the recesses 42a of this embodiment extends only partly along the length of the bushing 42, the recesses that extend over the entire length of the bushing 42 may equally be used. The recesses 42a of the housing 41 and the projections D on the engine A engage each other to accurately and easily position the housing 41 and also to prevent any undesirable rotation of the housing 21 during the turning of the stop nut 35 on the housing 41.

According to this embodiment, at least one of the electrical terminals 44 and 45 is sufficiently rigid for allowing it to be mechanically firmly held by a suitable tool (not shown) to prevent an undesirable rotation of the electrical terminals 44 and 45 upon turning of the thread-engaging stop nut 35 relative to the housing 41. The necessary rigidity of the electrical terminals 44 and 45 may be obtained by increasing the thickness of the electrical terminals 44 and 45 or by selecting a suitable material having enough rigidity. In the illustrated embodiment, the lower, ground terminal 45 is made thicker (0.3 mm for example) than the upper, output terminal 44 (0.1 mm–0.2 mm for example).

Figure 1:
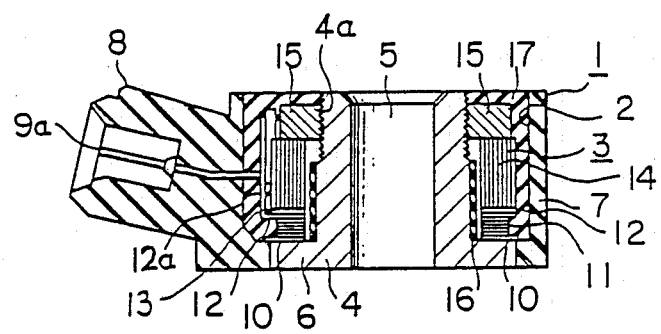
FIG. 1 is a sectional side view of an acceleration detector to which the present invention is applicable taken along line 1—1 of FIG. 3.
Figure 2:
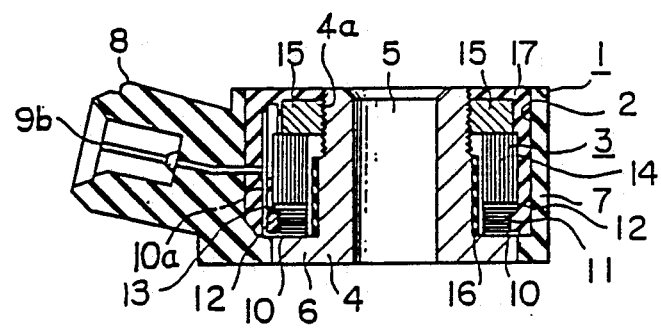
FIG. 2 is a sectional side view of the acceleration detector shown in FIG. 1 taken along line 2—2 of FIG. 3.
Figure 3:
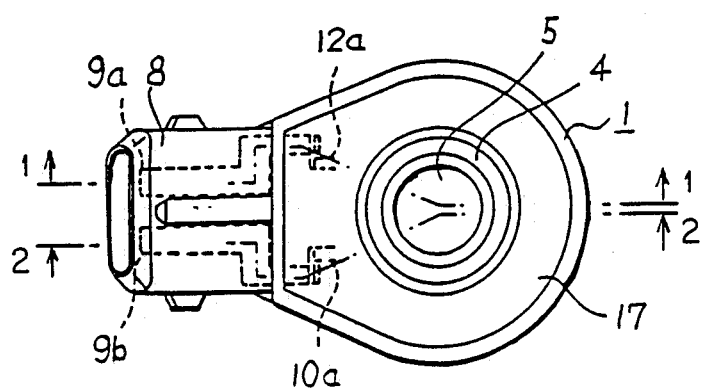
FIG. 3 is a plan view of the acceleration detector shown in FIGS. 1 and 2.
Figure 4:
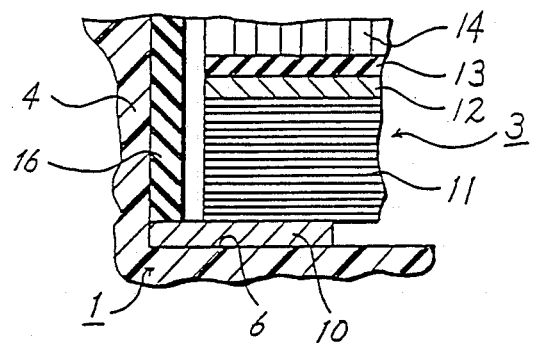
FIG. 4 is an enlarged sectional view illustrating the manner how the washer terminal plate can be misaligned relative to the piezoelectric element.
Figure 9:
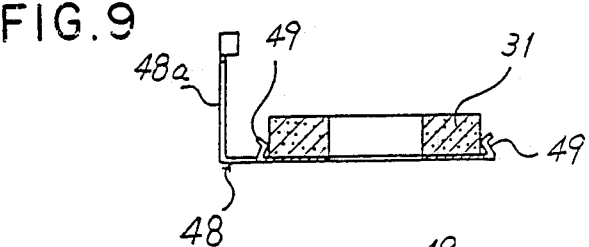
FIG. 9 is a sectional side view of the terminal plate of one embodiment of the present invention illustrating the relationship between the terminal plate and the piezoelectric element.
Figure 10:
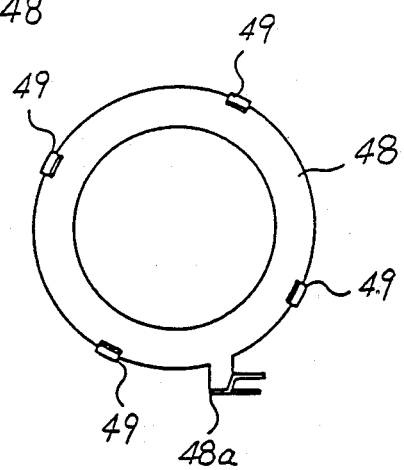
FIG. 10 is a plan view of the terminal plate shown in FIG. 9.
Figure 11:
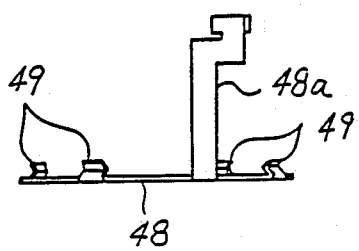
FIG. 11 is a front view of the terminal plate shown in FIG. 9.
Figure 12:
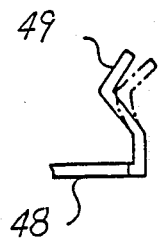
FIG. 12 is an enlarged fragmental view showing the engaging tab of the terminal plate shown in FIG. 9.

In FIGS. 9 to 12, a further embodiment of a ground terminal 48 is illustrated, from which it is seen that the washer-shaped ground terminal 48 is provided with a plurality of projections 49 or tabs integrally formed on the outer periphery of the ring-shaped terminal 48. The tabs 49 are bent to extend substantially perpendicularly to the plane of the ring portion of the terminal 48 and resilient so that they resiliently engage against the outer circumference of the piezoelectric element 31 as shown in FIG. 9, positively limiting the relative position of the piezoelectric element 31 and the terminal 48. With this arrangement, even when the insulating tube 16 is raised for any reason as shown in FIG. 4 during assembly, the washer terminal 48 cannot be shifted relative to the piezoelectric element 31 because the terminal 48 is attached to the piezoelectric element 31.

As has been described, according to the present invention, an acceleration detector that can be easily and accurately assembled is provided. Also, since the housing is provided with an engaging surface engageable with an external stationary structure such as a projection on an engine, an accurate positioning can be expected and the rotating torque acting on the bushing from the thread-engaging stop nut is not transmitted to the glue bonding the outer case and to the outer case. Also, since a low-friction washer may be provided between the stop nut and an acceleration transducer, the rotation of the terminal washer of the acceleration transducer assembly due to the tightening rotation of the stop nut is prevented. Also, at least one of the electric terminals may be made sufficiently rigid so that it can be firmly held by a suitable tool without fear of being deformed or damaged, whereby the rotation of the terminal washer of the acceleration transducer assembly due to the tightening rotation of the stop nut can be prevented by firmly holding the rigid terminal lead of the terminal washer. The housing of the acceleration detector may comprise a mechanical positioning means which also mechanically and electrically isolates the output and the ground terminal leads, ensuring an easy assembly and a proper electrical connection between the terminals and the leads. Further, since the washer terminal can be accurately positioned reactive to the piezoelectric element due to tabs resiliently engaging the element, accurate and efficient detection of the acceleration can be achieved. Furthermore, since the contacting surface of the stop nut is sufficiently large, the inertia of the weight can efficiently act upon the piezoelectric element, resulting in an efficient and accurate acceleration detector.

What is claimed is:

1. An acceleration detector comprising:
   a housing defining a cavity therein;
   an acceleration transducer assembly disposed in said cavity and including a piezoelectric element and an inertial weight;
   securing means, including a thread engaging fastener thread-engaging to said housing, for securing said transducer assembly to said housing, said thread-engaging fastener having a contact surface at which said thread-engaging fastener contacts and supports said transducer assembly;
   a resilient filler material applied around said acceleration transducer assembly for resiliently sealing said acceleration transducer assembly from the exterior, said resilient filler material being sufficiently resilient to allow the movement of said inertia weight relative to said housing when an acceleration is applied to said inertial weight; and
   means, disposed on said housing and including an engaging surface which is engagable with an external structure, for preventing an undesirable rotation of said housing upon turning of said thread engaging fastener relative to said housing.

2. An acceleration detector as claimed in claim 1, wherein said rotation preventing means comprises a recess having an engagement surface extending in a substantially radial direction.

3. An acceleration detector as claimed in claim 2, wherein said recess is formed in the bottom surface of said housing.

4. An acceleration detector as claimed in claim 2, wherein said recess is formed in an inner cylindrical surface of a central bore of said housing.

5. An acceleration detector comprising:
   a housing defining a cavity therein;
   an acceleration transducer assembly disposed in said cavity and including a piezoelectric element, an inertial weight and an electrical terminal;
   securing means, including a thread-engaging fastener thread-engaging to said housing, for securing said transducer assembly to said housing, said thread-engaging fastener having a contact surface at which said thread-engaging fastener contacts and supports said transducer assembly;
   a resilient filler material applied around said acceleration transducer assembly for resiliently sealing said resilient filler material being sufficiently resilient to allow the movement of said inertial weight relative to said housing when an acceleration is applied to said inertia weight; and
   means, disposed between said thread-engaging fastener and said electrical terminal of said transducer assembly, for preventing an undesirable rotation of said electrical terminal upon turning of said thread-engaging fastener relative to said housing.

6. An acceleration detector comprising:

a housing defining a cavity therein;

an acceleration transducer assembly disposed in said cavity and including a piezoelectric element, an inertial weight and a pair of electrical terminals;

securing means, including a thread-engaging fastener thread-engaging to said housing, for securing said transducer assembly to said housing, said thread-engaging fastener having a contact surface at which said thread-engaging fastener contacts and supports said transducer assembly;

wherein at least one of said electrical terminals has a sufficient rigidity for allowing the use of a tool on it to prevent an undesirable rotation of said at least one electrical terminal upon turning of said thread-engaging fastener relative to said housing; and a resilient filler material applied around said acceleration transducer assembly for resiliently sealing said acceleration transducer assembly from the exterior said resilient filler material being sufficiently resilient to allow the movement of said inertial weight relative to said housing when an acceleration is applied to said inertial weight.

7. An acceleration detector comprising:

a housing defining a cavity therein;

an acceleration transducer assembly disposed in said cavity and including a piezoelectric element, an inertial weight and a pair of electrical terminals;

securing means, including a thread-engaging fastener thread-engaging to said housing, for securing said transducer assembly to said housing, said thread-engaging fastener having a contact surface at which said thread-engaging fastener contacts and supports said transducer assembly;

a resilient filler material applied around said acceleration transducer assembly for resiliently sealing said acceleration transducer assembly from the exterior, said resilient filler material being sufficiently resilient to allow the movement of said inertial weight relative to said housing when an acceleration is applied to said inertial weight; and projection means, disposed within said cavity of said housing having an engaging surface which extends between said electrical terminals and which is engagable with at least one of said electrical terminals to prevent an undesirable rotation of said electrical terminals upon turning of said thread-engaging fastener relative to said housing.

8. An acceleration detector comprising:

a housing defining a cavity therein;

an acceleration transducer assembly disposed in said cavity and including a piezoelectric element and an inertial weight;

holding means including a contact surface and attached to said housing for holding said transducer assembly onto said housing, said contact surface contacting and supporting substantially the entire contact surface of said inertial weight of said transducer assembly; and a resilient filer material applied around said acceleration transducer assembly for resiliently sealing said acceleration transducer assembly from the exterior, said resilient filler material being sufficiently resilient to allow the movement of said inertial weight reactive to said housing when an acceleration is applied to said inertial weight.

* * * * *